(12) United States Patent
Kleber et al.

(10) Patent No.: US 7,497,604 B2
(45) Date of Patent: Mar. 3, 2009

(54) ILLUMINATED PANEL PORTION FOR VEHICLES AND VEHICULAR ACCESSORIES

(75) Inventors: Ron W. Kleber, Frankfort, IL (US); George G. Kleber, Homer Glen, IL (US); Randy G. Kleber, Oak Forest, IL (US)

(73) Assignee: Gator Customs, Inc., Crestwood, IL (US)

( * ) Notice: Subject to any disclaimer, the term of this patent is extended or adjusted under 35 U.S.C. 154(b) by 127 days.

(21) Appl. No.: 11/697,758

(22) Filed: Apr. 9, 2007

(65) Prior Publication Data

US 2008/0038984 A1 Feb. 14, 2008

Related U.S. Application Data

(62) Division of application No. 10/961,998, filed on Oct. 8, 2004, now Pat. No. 7,232,246.

(51) Int. Cl.
*F21V 33/00* (2006.01)
*B60Q 1/00* (2006.01)
*B60Q 1/26* (2006.01)
*B60Q 1/32* (2006.01)

(52) U.S. Cl. .............. 362/506; 362/505; 362/496; 296/191; 40/541; 427/355; 427/407.2

(58) Field of Classification Search .......... 427/162, 427/661, 655, 369, 402, 407.1, 407.2; 362/499, 362/501, 505, 506, 806, 473, 496, 498; 180/59.1, 180/219; 280/839, 835, 288.4; 40/541, 584, 40/580; 296/1.01, 191

See application file for complete search history.

(56) References Cited

U.S. PATENT DOCUMENTS 5,615,940 A * 4/1997 Barry .................. 362/473
6,454,422 B1 * 9/2002 Williams .............. 362/23

* cited by examiner

*Primary Examiner*—Jacob Y Choi
(74) *Attorney, Agent, or Firm*—Eugene M. Cummings, P.C.

(57) ABSTRACT

An illuminated panel portion for vehicles or vehicle accessories is provided having a generally translucent panel defining a selected design. The translucent panel is disposed in an aperture of an adjacent panel of the vehicle or vehicle accessory such that the outer surfaces of the translucent panel and adjacent panel are substantially flush. A light source is disposed in relation to the panel for illuminating the translucent panel.

18 Claims, 4 Drawing Sheets

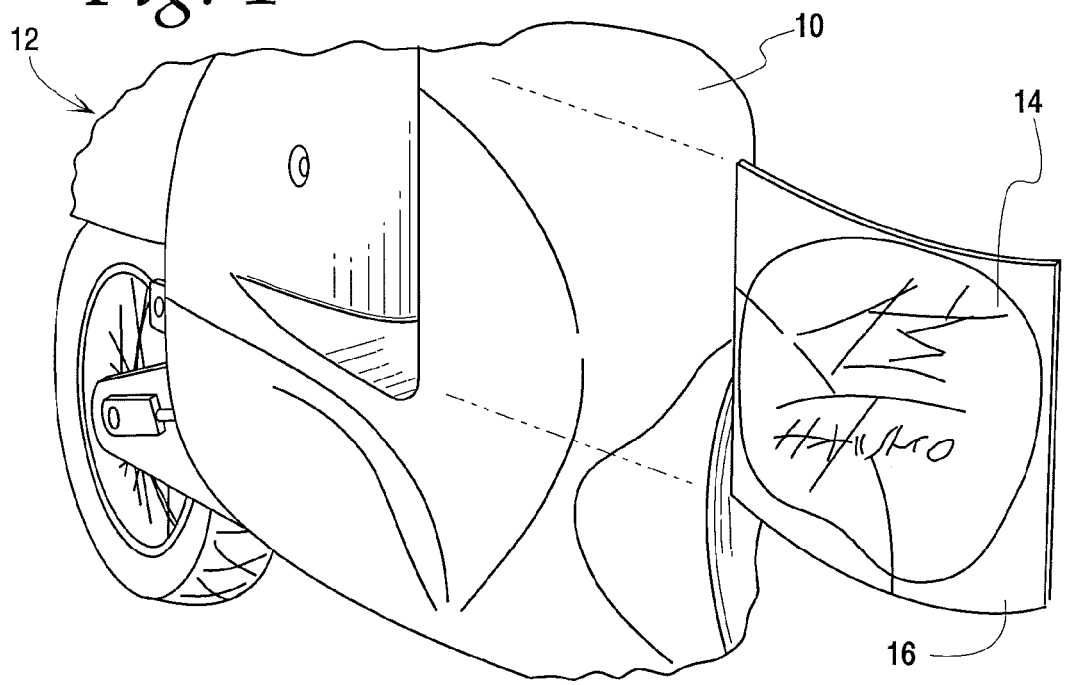
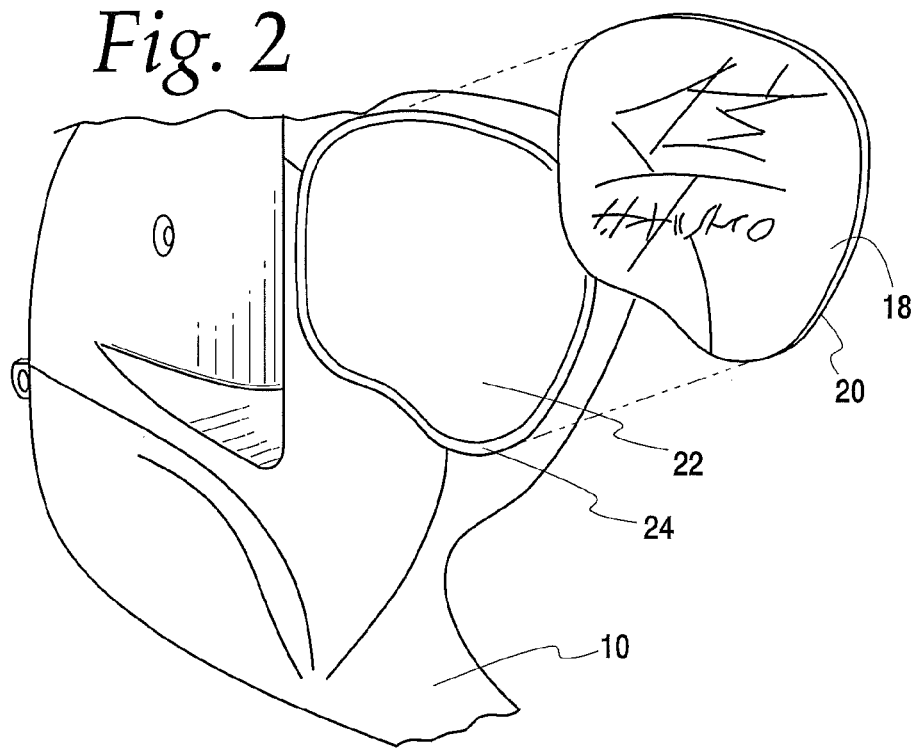

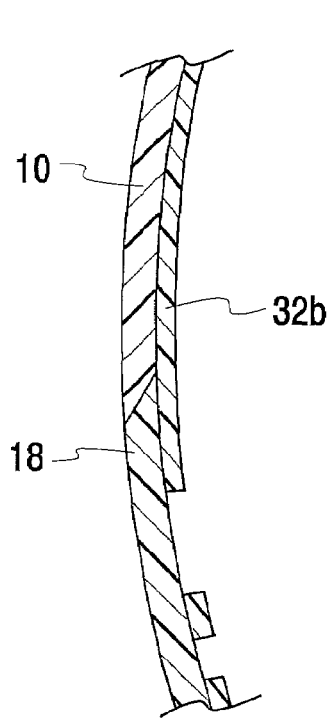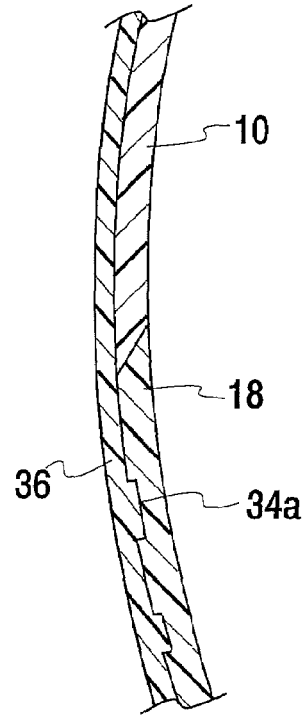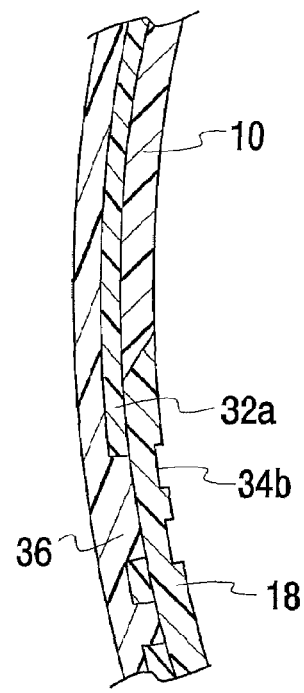

ILLUMINATED PANEL PORTION FOR VEHICLES AND VEHICULAR ACCESSORIES

RELATED APPLICATION

This application is a divisional application of U.S. patent application Ser. No. 10/961,998 filed Oct. 8, 2004 now U.S. Pat. No. 7,232,246 and entitled "Illuminated Panel Portion for Vehicles and Vehicular Accessories."

BACKGROUND OF THE INVENTION

The present invention generally relates to illuminated panel portions for vehicles and vehicular accessories. More specifically, the present invention relates to an illuminated panel portion including a generally translucent panel with an outer surface that is substantially flush with the outer surface of the adjacent panel of vehicles and vehicular accessories for illuminating a selected design defined by the translucent panel.

Illuminated devices for vehicles and vehicular accessories have been traditionally used to enhance the visibility of the vehicle or passenger. Also, illuminated devices have served to illuminate selected designs such as indicia, emblems, pictures, outlines, or other such artistic and other designs.

A number of illuminated devices have been designed to be mounted on various vehicle or vehicular accessory surfaces. For example, U.S. Pat. No. 6,190,026 describes an illuminated automotive emblem for a motor vehicle having a translucent display template that is illuminated from behind by a light source. U.S. Pat. Nos. 5,615,940 and 5,479,324 describes an illumination device mounted on a gas tank or shell.

These and other prior illumination devices are typically mounted onto or protrude from the surfaces of the vehicle or vehicular accessory. Such a mounting arrangement can actually increase the possibility of damage to the underlying machinery or circuitry protected by the support surface. For example, water may seep and pool between the mounting surface of the illumination device and the surface of the vehicle or vehicle accessory. If the illumination device covers an aperture in the vehicle or vehicle accessory surface, water can sometimes seep under the mounting surface of the illumination device and damage underlying machinery or circuitry.

Illumination devices are also typically mounted or protrude above the surface of the vehicle or vehicular accessory. This mounting arrangement alters the preexisting contour of the surface. By altering the contour of the vehicle or vehicle accessory surface, the aerodynamics, appearance or aesthetics, and performance of the vehicle and/or accessory may also be compromised. These potential drawbacks may be a disincentive for consumers to mount or install such illumination devices on their vehicles and/or vehicular accessories.

In a variation of the above mounting techniques U.S. Pat. No. 6,439,589 shows a mounting arrangement in which the desired design of the indicia is cut from the surface of the vehicle or vehicular accessory. This arrangement causes the edges of the cut-out portion to be raised above the outer surface of the illumination device. Moreover, because the indicia is cut out, the complexity of the indicia design is necessarily limited in order to maintain the structural integrity of the support surface of the vehicle or the vehicular accessory.

Therefore, it is an aspect and object of this invention to provide an illuminated panel portion including a generally translucent panel with an outer surface which avoids one or more of the drawbacks of prior illumination devices.

SUMMARY OF THE INVENTION

In accordance with one aspect of the present invention, an illuminated panel portion for vehicles or vehicle accessories is provided comprising a generally translucent panel defining a selected design. The translucent panel is disposed in an aperture of an adjacent panel of the vehicle or vehicle accessory such that the outer surfaces of the translucent panel and adjacent panel are substantially flush. A light source is disposed in relation to the translucent panel for illuminating the translucent panel.

The relationship between the translucent panel and the adjacent panel may be achieved in various ways. The translucent panel of the illuminated panel portion may include an outer edge and the adjacent panel may further include an edge defining the aperture in the adjacent panel such that the outer edge of the translucent panel is generally adjacent to the edge of the adjacent panel. The outer edge of the translucent panel may also be beveled, and the edge of the adjacent panel may be beveled in complementary fashion.

The selected design may also be defined by the translucent panel in various ways. For example, the outer edges of the translucent panel may define the selected design. Alternatively, the translucent panel may include an etched surface defining the selected design. In yet another alternative embodiment, the translucent panel may further comprise a generally opaque layer for defining a generally opaque area and a generally translucent area defining the selected design wherein the generally translucent area is illuminated by the light source.

In accordance with yet another aspect of the present invention, a method for making an illuminated panel portion for vehicles or vehicle accessories is further provided wherein an aperture is formed in a panel of the vehicle or vehicle accessory. A translucent panel defining a selected design is disposed in the aperture of the panel such that the outer adjacent surface of the panel and the outer surface of the translucent panel are substantially flush. A light source is further disposed in relation to the translucent panel for illuminating a selected design defined by the translucent panel.

The method for making the illuminated panel portion may further include shaping the translucent panel to the contour of the adjacent panel and/or beveling the respective edges of the translucent panel and adjacent panel in a complementary fashion.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE SEVERAL VIEWS OF THE DRAWINGS

FIG. 1 is an exploded perspective view illustrating the molding of a translucent material for defining a selected design to a body panel of a motorcycle in accordance with one embodiment of the present invention.

FIG. 2 is an exploded perspective view illustrating the translucent panel formed from the translucent material of FIG. 1 being positioned in an aperture defined by the body panel of FIG. 1 in accordance with one embodiment of the present invention.

FIG. 6 further shows a light source disposed in relation to the translucent panel for illuminating the translucent panel in accordance with an aspect of the present invention.

FIGS. 7a-7f illustrate the cross-section of various aspects of the present invention.

DETAILED DESCRIPTION OF THE PREFERRED EMBODIMENTS

Figure 3:
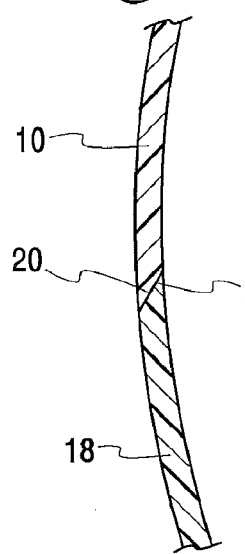
FIG. 3 is a cross sectional view illustrating the engagement of beveled edges of the translucent panel and the adjacent body panel when the translucent panel is disposed in the aperture defined by the body panel as shown in FIG. 2 in accordance with one embodiment of the present invention.

The illuminated panel portion as described in the present invention may generally be used in illuminating a translucent panel at a number of different locations on vehicles or vehicular accessories. For example, in order to enhance visibility and/or aesthetic quality of the vehicle, illuminated panel portions may be incorporated on the body panel, fender, bumper, hood, faring, or other such areas of the vehicle. Examples of vehicles which may accommodate illuminated panel portions include trucks, cars, motorcycles, boats, airplanes, snowmobiles, off-road vehicles, or any other vehicle. Illuminated panel portions may further be implemented in vehicular accessories such as helmets, trailers, luggage carriers, or any other such vehicle accessory.

For purposes of illustration and not limitation, the present invention is described below in the context of an illuminated panel portion including a generally translucent panel having an outer surface which is substantially flush to the outer surface of the adjacent motorcycle body panel for illuminating a selected design. As described above, however, it is important to note that the illuminated panel portion and method of installing such may be implemented on other areas and in other types of vehicles or vehicular accessories.

The term "panel" as used herein is intended to have a broad meaning. Panel may represent a separate or distinct part of a surface area of some extent. This surface area may be larger or smaller as desired without departing from the present invention. For example, as discussed in detail below, the translucent panel may be larger than the selected design. Alternatively, the translucent panel may also be sized and shaped such that the translucent panel itself constitutes the selected design. Regarding the adjacent panel, the adjacent panel may be a portion the body panel, fender, bumper, hood, or other such areas of a vehicle. Alternatively the adjacent panel may be a portion of a helmet, trailer, luggage carrier, or any other such vehicle accessory.

FIG. 1 illustrates a body panel 10 of a motorcycle 12 wherein a selected design 14 is to be incorporated and illuminated. In forming the illuminated panel portion, a generally translucent material 16 is provided preferably in the form of cast acrylic, although other materials may alternatively be used which are generally transparent or translucent to allow light to pass therethrough.

To form the desired shape, the translucent material 16 is also preferably moldable, such as being thermoplastic. In this embodiment, the translucent material 16 is heated to a temperature of preferably 240° F. such that it becomes malleable. The thickness of the translucent material 16 may be about the same thickness of the body panel 10, although it may also be thinner or thicker as desired, without departing from the present invention. In the illustrated installation, the thicknesses of the translucent material 16 and the body panel 10 are each about 0.25 inches (6.3 mm) thick.

The heated translucent material 16 is placed onto the outer surface of the body panel 10 on the area where the translucent material 16 will be installed, and pressed against the outer surface such that it molds or conforms to the contour of the body panel 10. It is important to note that other molding or forming methods may also be used, such as cast molding using resin or other generally liquid molding material, plug molding, machining, and other such molding or forming methods.

Now referring to FIGS. 2 and 3, an area larger than the outline of the selected design 14 is cut from the translucent material 16, thereby forming a translucent panel 18. A beveled edge 20 may be formed on the outer edge of the translucent panel 18 by beveling this outer edge from the inner surface of the translucent panel.

An aperture 22 in the body panel 10 is cut or otherwise formed such that the translucent panel 18 is slightly smaller the aperture 22. A beveled edge 24 is formed on the edge defining the aperture 22 in the body panel 10 by beveling this edge from the outer surface of the body panel 10.

Referring to FIG. 3, the translucent panel 18 is disposed in the aperture 22 of the body panel 10 such that the edge of the translucent panel 18 is generally adjacent to and flush with the body panel 10. Although the flush relationship may be achieved in various ways, in the illustrated embodiment, the edge 20 of the translucent panel 18 is beveled from the inner surface of the translucent panel 18, whereas the edge 24 defining the aperture 22 in the body panel 10 is beveled from the outer surface of the body panel 10. Therefore, these beveled edges 22, 24 are beveled in complementary fashion that allows the edge of the panels to support one another and the outer surface to be generally flush.

Specifically, the beveled edge 24 defining the aperture 22 in the body panel 10 supports the beveled edge 20 of the translucent panel 18 when the translucent panel 18 is disposed in the aperture 22 of the body panel 10. Accordingly, in this embodiment, the body panel serves as a support surface for the translucent panel 18. The beveled edges 22, 24 further provide for a substantial engagement area between the translucent panel 18 and the body panel 10, allowing for a better bond between the edge 22 of the translucent panel 18 and the edge 24 defining the aperture 22 in the body panel 10.

It is important to note that the edges of the translucent panel 18 and that defining the aperture 22 in the body panel 10 do not necessarily need to be beveled. It is further not required that the body panel 10 serve as a support surface for the translucent panel 18. Instead, the translucent panel 18 merely needs to be disposed in the aperture 22 of the body panel 10 such that the outer surface of translucent panel 18 and the outer surface of the adjacent body panel 10 are substantially flush.

The translucent panel 18 may further be affixed to the body panel 10 in various ways. For example, the inner surface of the translucent panel may be taped or mechanically fastened (e.g. using brackets) to the inner surface of the body panel.

Figure 4:
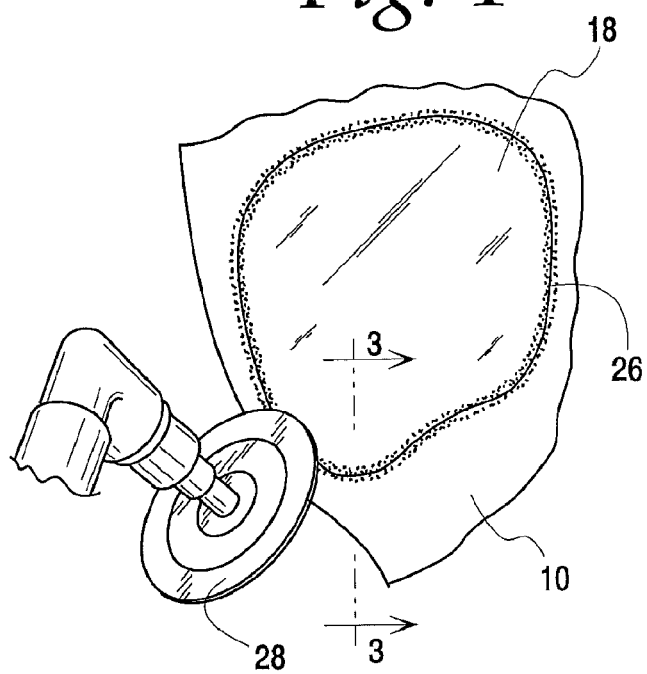
FIG. 4 is a perspective view illustrating the sanding of epoxy on the inner surface of the translucent panel-body panel engagement in accordance with one embodiment of the present invention.

In yet another example, referring to FIG. 4, the translucent panel 18 is secured to the body panel 10 with a suitable bonding material 26, preferably a non-shrinking epoxy. This bonding material 26 is applied to the junctures between the translucent panel 18 and the body panel 18 at both the inner and outer surfaces. When the bonding material 26 cures, the outer surface is sanded smooth with a sanding device 28 such that all the sharp edges are feathered smooth. Plastic body fillers are further applied to correct any imperfections therein. Suitable fillers include fiberglass mixture fillers, polyester fillers, hardest resin fillers and/or any other such fillers (e.g., BONDO® fiberglass resin manufactured by the BONDO® Corporation).

Figure 7A:
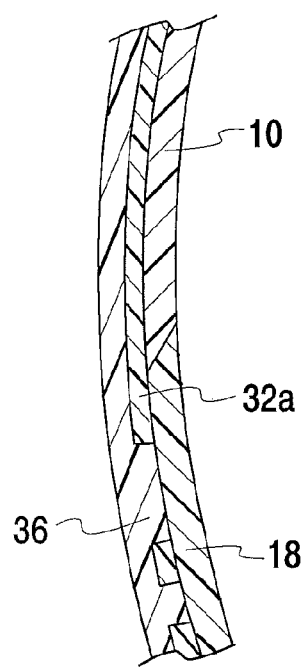
Figure 7B:
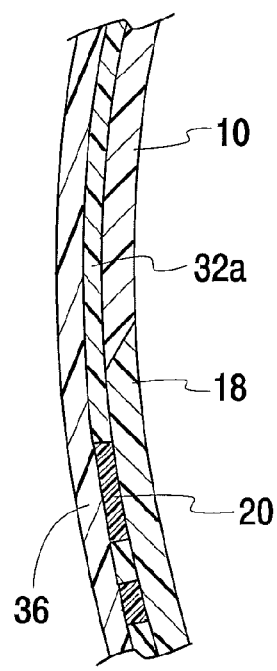
Figure 7C:
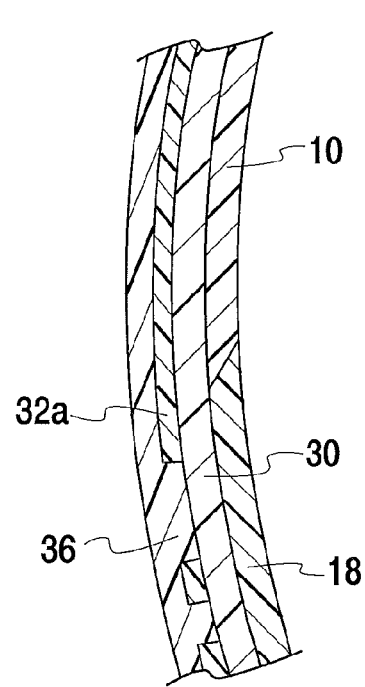

The translucent panel 18 may define the selected design 14 in various ways. In one embodiment, paint which dries generally transparent or translucent (e.g., shown by 20 or 30 in FIGS. 7b and 7c, respectively) may be painted on the translucent panel 18 such that when the translucent panel 18 is illuminated a colored light effect is achieved. These paints are generally known in the art as candy colored paints.

In another embodiment, the outer edges of the translucent panel may in itself define the selected design. In this case, the translucent panel may have generally the same size and shape of the selected design.

In yet another embodiment, which is shown in FIGS. 1-5 and more particularly FIGS. 7a-7f herein, opaque layers 32a, 32b may also be added to either the inner or outer surface of the translucent panel 18 to define generally translucent and generally opaque areas 32a, 32b in the translucent panel 18. For aesthetics, these opaque areas 32a, 32b may be of the same color as the body panel 10 in order to match the body panel color and the areas not covered by the opaque layer 32a, 32b remain translucent for back-illumination.

In an illustrative example of applying an opaque layer 32a, 32b, a sticker mask for the selected design 14 may be affixed to the outer surface of the translucent panel 18. This sticker mask may serve as a stencil for the selected design. Alternatively, the selected design 14 may be etched onto either the outer or inner surface of the translucent panel 18 (e.g., as shown at 34a and 34b in FIGS. 7e and 7f). If the selected design 14 is etched, a sticker mask may cover the etched design.

After the sticker mask is applied, the entire outer surface is sealed with an epoxy sealer and a coat of paint is applied. Paint matching the color of the body panel 10 may be used in conjunction with the stencil. In this manner, the areas covered by the sticker mask define translucent areas, whereas the areas left uncovered define opaque areas 32a, 32b after removal of the mask. Accordingly, if the sticker mask serves as a stencil for the selected design 14, the areas covered by the sticker mask in the form of the selected design 14 is left translucent, whereas the area left uncovered is painted to define an opaque area matching the color of the body panel 10. Alternatively, if the selected design 14 is etched onto the translucent panel 18 (e.g., as shown at 34a and 34b in FIGS. 7e and 7f), the sticker mask may be used to cover the selected design 14 such that the area covered is left translucent.

After the sticker mask is removed, a clear urethane coating 36 may be applied to the entire outer surface. The removal of the sticker mask may cause an uneven surface with raised edges. In that event, the outer surface may be wetsanded and additional clear urethane coatings 36 are applied to achieve a smooth, lustrous finish. This process of wetsanding and applying additional clear urethane is repeated until a smooth, even surface is achieved.

Figure 5:
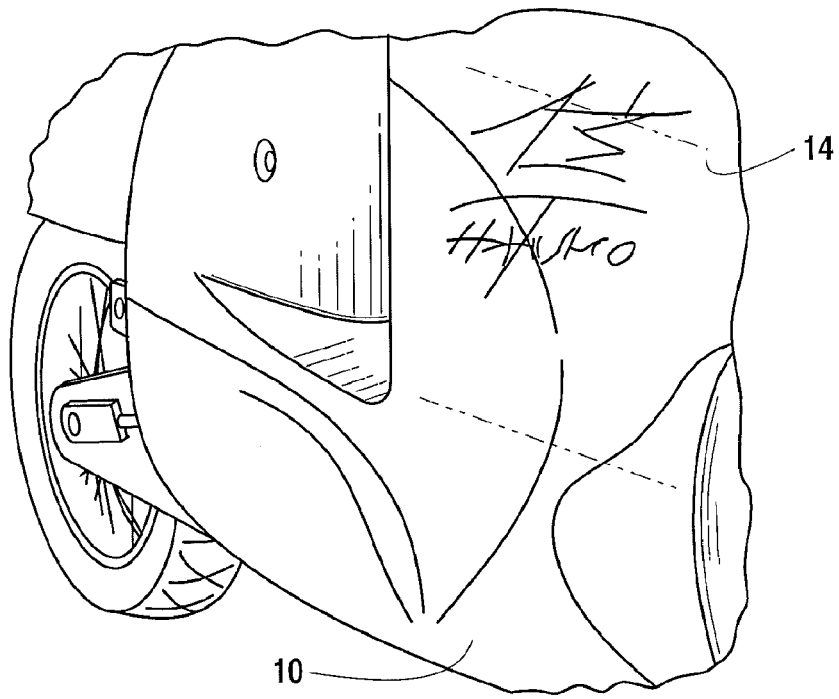
FIG. 5 is a perspective view illustrating the selected design on the motorcycle in accordance with one embodiment of the present invention.
Figure 6:
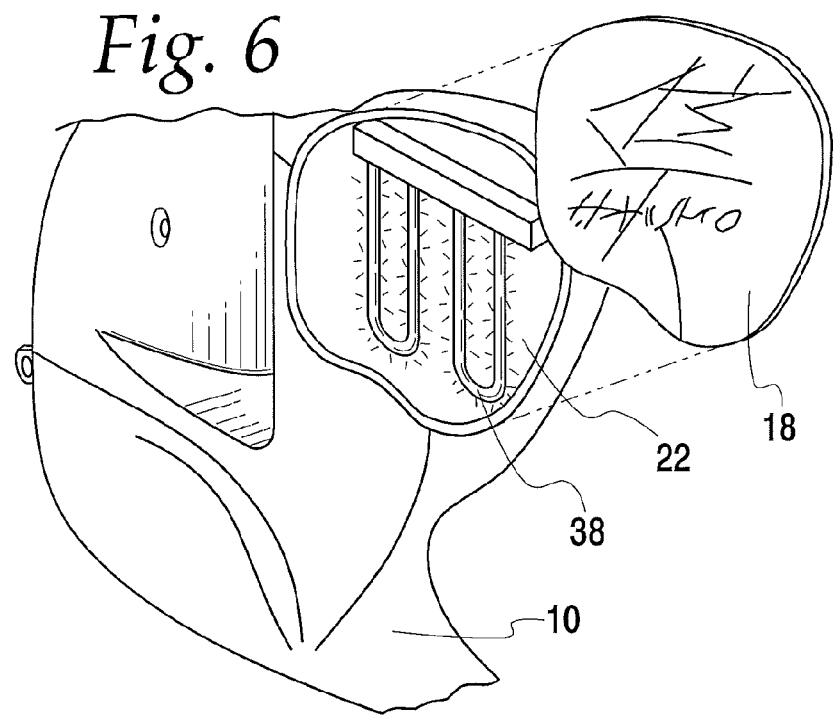
FIG. 6 is an exploded perspective view illustrating the translucent panel formed from the translucent material of FIG. 1 being positioned in an aperture defined by the body panel of FIG. 1.

A light source 38 as shown in FIG. 6 is disposed in relation to the translucent panel 18 (typically behind the panel) for illuminating the translucent panel 18. As illustrated in FIG. 5, the resulting effect is a translucent area being in the form of the selected design 14 being illuminated, whereas the opaque areas are painted to match the body panel 10. The light source may be an LED, incandescent, neon, or any other chosen light source. The light source may further be connected to various functional components of the vehicle. For example, the light source may be connected to the turn signal mechanism or brakes, thereby providing enhanced visibility of the turn signal or brake. Alternatively, if the illuminated panel portion were installed in a helmet or on the back of a vehicle, the light source may be connected to signal when vehicle's brakes are engaged (e.g., through hard wiring or wireless transmission means).

It will also be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A method for making an illuminated panel portion for vehicles or vehicular accessories, comprising: forming an aperture in an adjacent panel having an outer surface, disposing a generally translucent panel having an outer surface in the aperture of the adjacent panel, such that the outer surface of the adjacent panel and the outer surface of the translucent panel are substantially flush, painting a generally opaque layer on the translucent panel to define a selected design thereon, applying one or more layers of clear coating formed on said translucent and adjacent panels for forming a smooth, even surface finish thereto, and disposing a light source in relation to the panel for illuminating the panel for illuminating said translucent panel.

2. The method for making an illuminated panel portion of claim 1 further comprising shaping the generally translucent panel to the contour of the adjacent panel.

3. The method for making an illuminated panel portion of claim 1 further comprising etching a selected design into the translucent panel.

4. The method for making an illuminated panel portion of claim 1 wherein the painted generally opaque layer on the translucent panel defines a generally opaque area and a generally translucent area such that the generally translucent area is illuminated by said light source.

5. The method for making an illuminated panel portion of claim 1 further comprising forming a beveled outer edge about the translucent panel and forming a complementary beveled edge on the adjacent panel about the aperture.

6. The method for making an illuminated panel portion of claim 1 wherein the adjacent panel is a select color, and the painted generally opaque layer is painted generally the same color as the adjacent panel.

7. The method for making an illuminated panel portion of claim 1 wherein the translucent panel defines the selected design.

8. The method for making an illuminated panel portion of claim 1 further comprising extending the painted generally opaque layer such that it is formed on top of the adjacent panel.

9. The method for making an illuminated panel portion of claim 1 further comprising forming a generally translucent paint layer between the translucent panel and the one or more layers of clear coating.

10. The method for making an illuminated panel portion of claim 9 wherein the generally truculent paint layer is a candy colored paint layer.

11. A method for making an illuminated panel portion for vehicles or vehicular accessories, comprising: applying a generally opaque painted layer on a surface of a generally translucent panel, wherein the opaque painted layer forms an uneven interface with the generally translucent panel; applying a clear coating on the surface of the generally translucent panel; repeating the steps for evening the interface and applying a clear coating to achieve a smooth, even surface on the surface of the generally translucent panel; and disposing a light source in relation to the generally translucent panel for illuminating the generally translucent panel.

12. The method for making an illuminated panel portion for vehicles or vehicular accessories of claim 11, wherein the opaque layer is applied using a sticker mask.

13. The method for making an illuminated panel portion for vehicles or vehicular accessories of claim 11, wherein the uneven interface between the opaque layer and the surface of the generally translucent panel is wetsanded in order to achieve evening.

14. The method for making an illuminated panel portion of claim 11 wherein the adjacent panel is a select color, and the painted generally opaque layer is painted generally the same color as the adjacent panel.

15. The method for making an illuminated panel portion of claim 11 wherein the translucent panel defines the selected design.

16. The method for making an illuminated panel portion of claim 11 further comprising extending the painted generally opaque layer such that it is formed on top of the adjacent panel.

17. The method for making an illuminated panel portion of claim 11 further comprising forming a generally translucent paint layer between the translucent panel and the one or more layers of clear coating.

18. The method for making an illuminated panel portion of claim 17 wherein the generally translucent paint layer is a candy colored paint layer.

* * * * *